(12) United States Patent
Zhang

(10) Patent No.: US 10,528,613 B2
(45) Date of Patent: Jan. 7, 2020

(54) METHOD AND APPARATUS FOR PERFORMING A PARALLEL SEARCH OPERATION

(71) Applicant: Advanced Micro Devices, Inc., Sunnyvale, CA (US)

(72) Inventor: Dong Ping Zhang, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 841 days.

(21) Appl. No.: 14/948,892

(22) Filed: Nov. 23, 2015

(65) Prior Publication Data

US 2017/0147608 A1    May 25, 2017

(51) Int. Cl.
*G06F 16/50* (2019.01)
*G06F 16/2458* (2019.01)
*G06F 16/2457* (2019.01)
*G06F 16/53* (2019.01)
*G06F 16/583* (2019.01)

(52) U.S. Cl.
CPC .......... *G06F 16/50* (2019.01); *G06F 16/2471* (2019.01); *G06F 16/24578* (2019.01); *G06F 16/53* (2019.01); *G06F 16/583* (2019.01)

(58) Field of Classification Search
CPC .... G06F 16/50; G06F 16/2471; G06F 16/583; G06F 16/53; G06F 16/24578
USPC ....................................................... 707/723
See application file for complete search history.

(56) References Cited

U.S. PATENT DOCUMENTS

| | | | | |
|---|---|---|---|---|
| 8,352,494 B1 * | 1/2013 | Badoiu | ............. | G06F 17/30256 707/772 |
| 8,473,532 B1 * | 6/2013 | Ben | ......................... | G06F 16/16 707/829 |
| 9,189,498 B1 | 11/2015 | Jing et al. | | |
| 9,442,854 B2 * | 9/2016 | Hyde | .................. | G06F 12/0831 |
| 2003/0222879 A1 * | 12/2003 | Lin | ........................... | G06F 7/57 345/530 |

(Continued)

FOREIGN PATENT DOCUMENTS

| | | |
|---|---|---|
| EP | 2 757521 A1 | 7/2014 |
| WO | 2003088033 A1 | 10/2003 |

OTHER PUBLICATIONS

Fei Fei, L. et al., "A Bayesian Hierarchical Model for Learning Natural Scene Categories", IEEE Computer Society Conference on Computer Vision and Pattern Recognition, Jun. 20-25, 2005, pp. 524-531, vol. 2, IEEE, U.S.A.

(Continued)

*Primary Examiner* — Robert W Beausoliel, Jr.
*Assistant Examiner* — Arthur Ganger
(74) *Attorney, Agent, or Firm* — Volpe and Koenig, P.C.

(57) ABSTRACT

A method and apparatus for performing a search in a processor-in-memory (PIM) system having a first processor and at least one memory module includes receiving one or more images by the first processor. The first processor sends a query for a search of memory for a matching image to the one or more images to at least one memory module, which searches memory in the memory module, in response to the received query. The at least one memory module sends the results of the search to the first processor, and the first processor performs a comparison of the received results from the at least one memory module to the received one or more images.

33 Claims, 6 Drawing Sheets

(56) References Cited

U.S. PATENT DOCUMENTS

| | | |
|---|---|---|
| 2010/0135584 A1 | 6/2010 | Tang et al. |
| 2010/0318764 A1 | 12/2010 | Greyzck |
| 2011/0085739 A1 | 4/2011 | Zhang et al. |
| 2011/0093662 A1 | 4/2011 | Walker et al. |
| 2012/0173549 A1* | 7/2012 | Bouguet ........... G06F 17/30256 707/749 |
| 2012/0226680 A1 | 9/2012 | Bennett |
| 2014/0089609 A1 | 3/2014 | Kegel et al. |
| 2014/0310314 A1* | 10/2014 | Li .................... G06F 17/30247 707/780 |

OTHER PUBLICATIONS

Gong, Y. et al., "A Multi-View Embedding Space for Internet Images, Tags, and Their Semantics", International Journal of Computer Vision, Jan. 2014, pp. 210-233, vol. 106, Issue 2 (Accepted Sep. 7, 2013, Published Online Oct. 2, 2013).

Aly, M. et al., "Using More Visual Words in Bag of Words Large Scale Image Search", Technical Report, Caltech, Apr. 2011, 9 pgs., USA.

Wu, Zhong et al., "Bundling Features for Large Scale Partial-Duplicate Web Image Search", IEEE Computer Society Conference on Computer Vision and Pattern Recognition, Jun. 20-25, 2009, pp. 25-32, IEEE, Miami, FL, USA.

Douze, Matthijs et al., "Evaluation of GIST descriptors for web-scale image search", Proceedings of the ACM International Conference on Image and Video Retrieval, Jul. 8-10, 2009, 8 pgs., Article No. 19, Santorini, GR.

"Empowering Visual Categorization with the GPU"; Koen E.A. VanDeSande et al.; IEEE Transactions on Multimedia, IEEE Service Center, Piscataway, NJ (US); vol. 13, No. 1 (Feb. 1, 2011), pp. 60-70; XP011342416.

* cited by examiner

METHOD AND APPARATUS FOR PERFORMING A PARALLEL SEARCH OPERATION

FIELD OF THE INVENTION

The present invention is generally directed to performing a search operation, and more particularly to a method and apparatus for performing a parallel search operation.

BACKGROUND

The invention of the digital camera, and its incorporation into cellular phones, has ushered in an era of multitudes of pictures being taken and stored than ever before. People are taking hundreds, and even thousands, of pictures and uploading the images to memory, (e.g., on their computer) to a level that they may not even know what images they have. Accordingly, it can be a very daunting task to search memory to see if a particular image is stored in memory, particularly using conventional methods.

Conventional large scale web image searches are generally performed utilizing a textual "bag of words" scheme. That is, an image includes a textual description, (i.e., bag of words). A text search is initiated, which may optionally also include a geometric or image verification, and images are returned based upon the initiated text search. The "bag of words" approach heavily relies on user supplied meta-data or the accuracy of the object labeling and recognition. Image features are required to be tagged or translated to textual word descriptions. Oftentimes, when a user uploads pictures, for example, the images are uploaded with the image file being given a generic name by the camera during uploading. Users do not always rename all of the images stored in memory with accurate textual descriptions, making searching for particular types of images problematic.

Additionally, large scale multimedia searching is an issue that search engines and social networking sites are trying to tackle after the text search domain has become relatively mature and well established. With the growing amount of multimedia data, efficient, (e.g., both in terms of service quality and energy consumption), image searching in an image dataset or image searching in mixed unstructured data or videos is becoming important for the purpose of scene/object recognition/reconstruction, copyright attack detection, robotic vision, advertisement placement, and the like. Moreover, supporting web scale image searching may be expensive, as it may require significant hardware with large power consumption.

It would therefore be beneficial to provide a method and apparatus for performing an image search that searches for images based upon the properties of the images themselves.

SUMMARY OF EMBODIMENTS

An embodiment directed to a method of performing an image search is disclosed. The method includes performing a search in a processor-in-memory (PIM) system having a first processor and at least one memory module that receives a one or more images by the first processor. The host processor sends a query for a search of memory for a matching image to the one or more images to at least one memory module, which searches memory in the memory module, in response to the received query. The at least one memory module sends the results of the search to the first processor, and the first processor performs a comparison of the received results from the at least one memory module to the received one or more images.

An embodiment directed to a processor is disclosed. The processor includes circuitry configured to receive one or more images, and circuitry configured to send, to at least one memory module, a query for a search of memory for a matching image to the one or more images. The processor includes circuitry configured to receive, from the at least one memory module, results of a search of images stored in a memory in the memory module, in response to the received query, and circuitry configured to perform a comparison of the received results from the at least one memory module to the received one or more images.

An embodiment directed to a system is disclosed. The system includes a processor and at least one memory module. The processor comprises circuitry configured to receive one or more images, circuitry configured to send, to the at least one memory module, a query for a search of memory for a matching image to the one or more images, circuitry configured to receive, from the at least one memory module, results of a search of images stored in a memory in the memory module, and circuitry configured to perform a comparison of the received results from the at least one memory module to the received one or more images. The at least one memory module includes circuitry configured to perform a search of images stored in a memory in the memory module, in response to the received query, and circuitry configured to send the results of the search to the processor.

An embodiment directed to a method implemented in a processor-in-memory (PIM) system having a first processor and a plurality of memory modules is disclosed. The method includes uploading and classifying one or more images by their image data. The images are partitioned and stored on the plurality of memory modules based upon a classification of the image data. One or more query images is received by the first processor and the first processor sends, to the plurality of memory modules, a query for a search of memory for a matching image to the one or more query images. Each memory module of the plurality of memory modules performs a search of images stored in a memory in that memory module, in response to the received query. Each memory module of the plurality of memory modules sends results of the search to the first processor, and the first processor performs a comparison of the received results from the plurality of memory modules to the received one or more images.

An embodiment directed to a non-transitory computer-readable medium is disclosed. The non-transitory computer-readable medium has instructions recorded thereon that, when executed by a computing device, cause the computing device to perform operations including receiving one or more images, sending a query for a search of memory for a matching image to the one or more images, performing a search of images stored in a memory in a memory module, in response to the received query, sending results of the search, and performing a comparison of the received results from the memory module to the received one or more images.

BRIEF DESCRIPTION OF THE DRAWINGS

A more detailed understanding may be had from the following description, given by way of example in conjunction with the accompanying drawings wherein.

DETAILED DESCRIPTION OF THE EMBODIMENTS

Although a more detailed description of the embodiments is provided below, briefly a hybrid image search mechanism for a processor-in-memory (PIM) system is provided. There are various strategies that may be utilized for the compression of image features/descriptors. The image descriptors include several categories, such as, a global descriptor, (e.g., GIST), a local descriptor, (e.g., Scale Invariant Feature Transform (SIFT), Oriented FAST and Rotated Brief (ORB) and SURF), or a regional descriptor, (e.g, the basic properties of a region such as average greyscale or variance). While the global descriptor can represent the image relatively efficiently both in terms of storage space and its computational cost, global-descriptor-based image comparison can be less robust and less discriminant compared with local approaches. For example, the global descriptor may be sensitive to transformations, changes of viewpoint, illumination changes, cluttering, cropping, occlusion, and the like. However, the local descriptor approach can be very expensive to compute and its feature sets are often much larger than the global and regional ones for storage. But its invariance to rotation and scaling, and robustness towards other formats of image variations may make it useful in the image search domain, in particular as the main component of a "Bag of Features" (BoF) approach.

The method and apparatus described below relates to image searching with no additional metadata or tags being specified by users. That is, using image data alone to eliminate any dependency on user provided information. Many components of image searching may be performed in the local memory stack for each PIM, such as computing global descriptors for efficiency purposes with relatively low accuracy, classifications and dimensionality reduction of feature sets. Subsequent local descriptor computation and verification may also be performed in the local stack within a reduced search space, which may incur higher computational cost and higher accuracy levels. The query image, (i.e., image to be searched), is duplicated on each PIM and the search results from each PIM are presented to the host processor where they are merged to construct the final rank. This in-memory processing may reduce the aggregated data traffic across an entire system, as memory accesses are limited to predominantly the local stack or stacks. Accordingly, search efficiency per query may be increased, while energy consumption per query is reduced. Accordingly, below is described a hybrid method and apparatus that may utilize the merits that both global and local descriptors offer, while limiting their drawbacks, in a PIM-enabled system.

Figure 1:
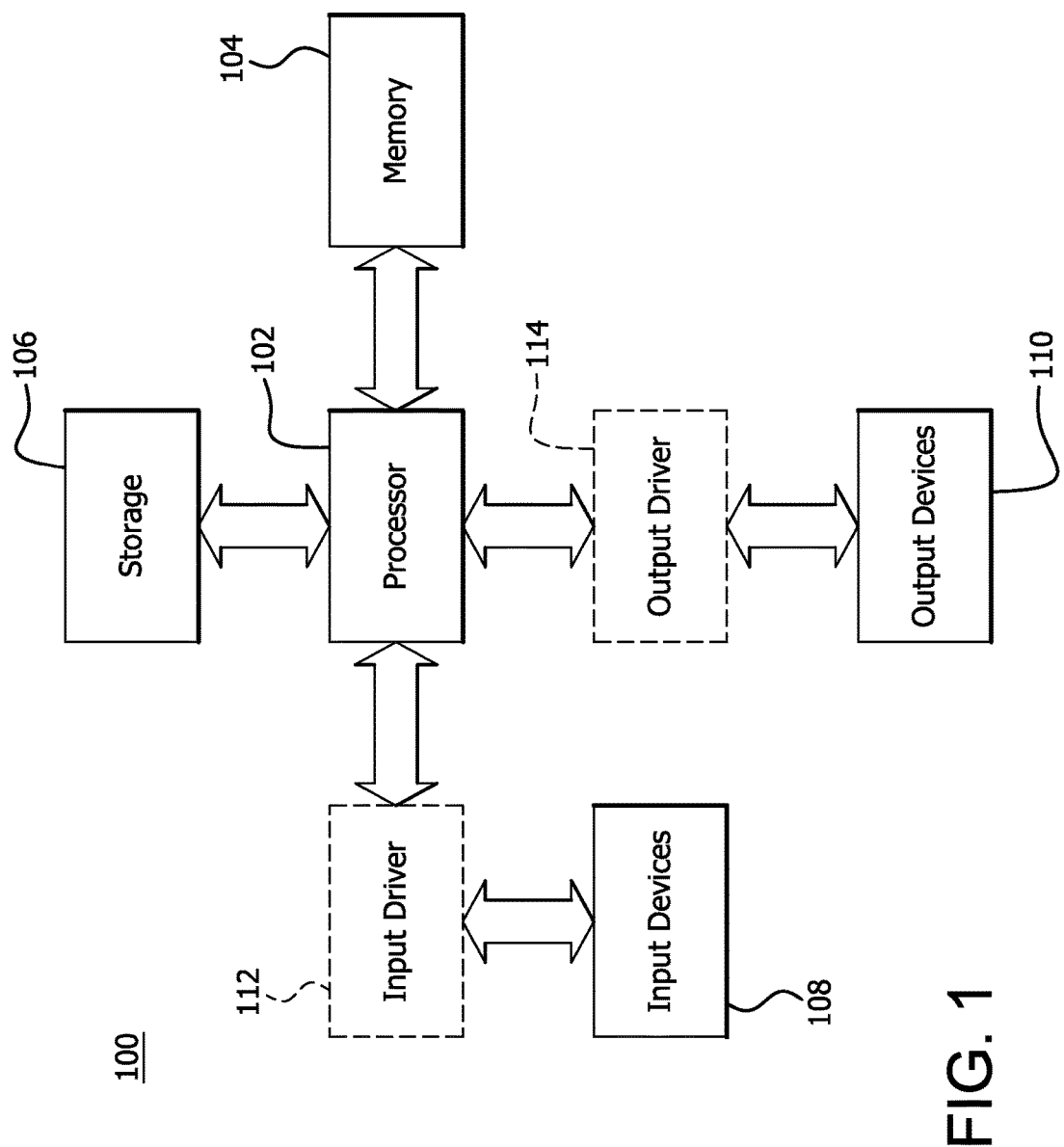
FIG. 1 is a block diagram of an example device in which one or more disclosed embodiments may be implemented.

FIG. 1 is a block diagram of an example device 100 in which one or more disclosed embodiments may be implemented. The device 100 may include a computer, for example, a desktop computer, a tablet computer, a gaming device, a handheld device, a set-top box, a television, or a mobile phone. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. Although described embodiments include a main display, the invention may be practiced without a main display, and only include a source device of video. In this way, the control territory may be an office environment with a plurality of portable devices and no main display.

Figure 2:
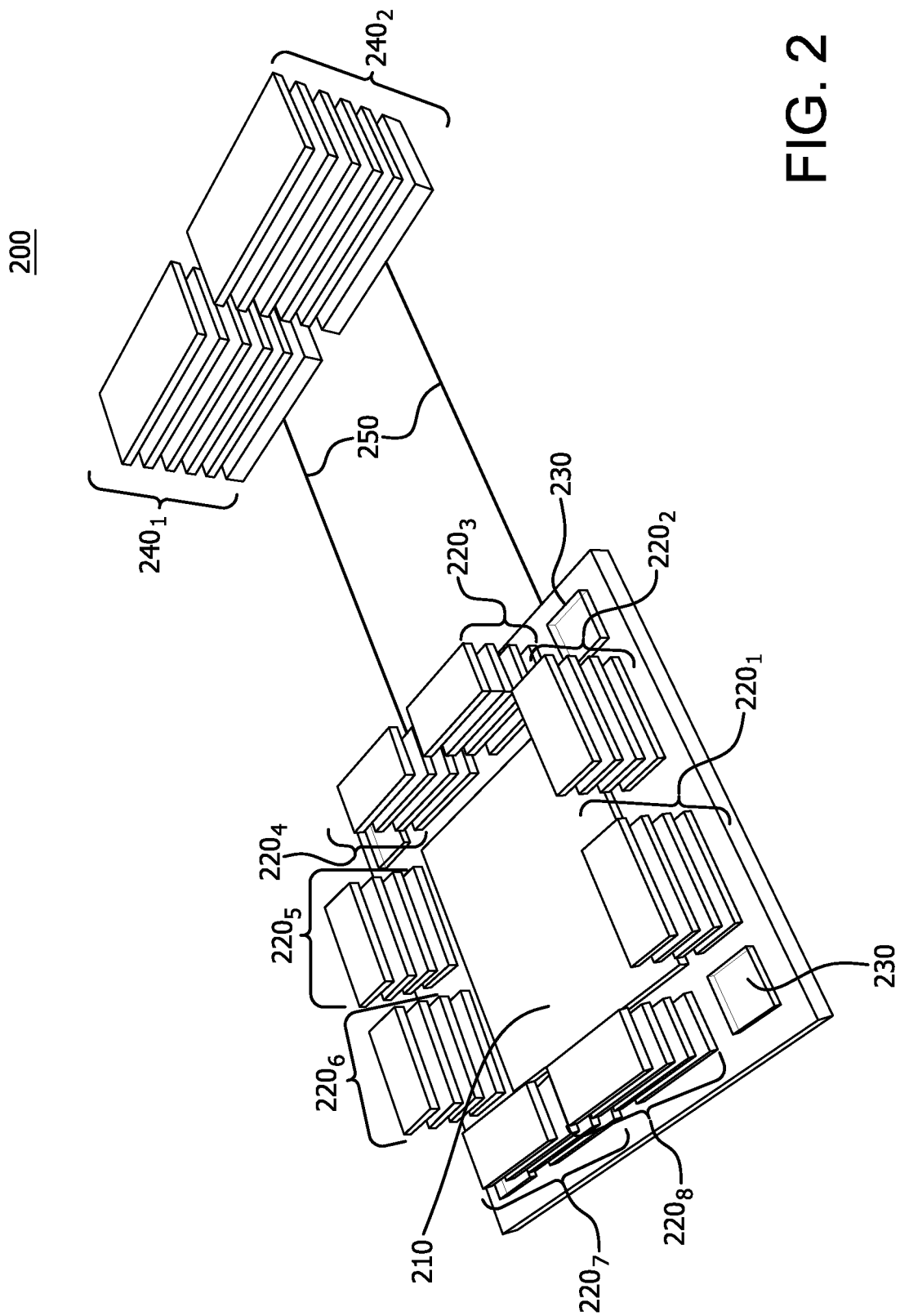
FIG. 2 is a schematic representation of an example architecture for performing a parallel search operation according to an embodiment.

FIG. 2 is a schematic representation of an example architecture 200 for performing a parallel search operation according to an embodiment. The architecture 200 may include a host processor 210, memory modules 220, (designated $220_1$-$220_8$), in-package photonics units 230, and additional memory modules 240, (designated $240_1$ and $240_2$). The host processor 210 may be a heterogeneous high performance accelerated processing unit (APU). The memory modules 220 may include PIM modules having a logic die stacked beneath one or more dynamic random access memory (DRAM) dies. The additional memory modules 240 may also include PIM modules having logic dies stacked beneath one or more DRAM dies, and may be external to the chip to provide additional memory capacity. Memory modules 240 may be in communication via a link 250, (e.g., optical link), with the host processor 210, and may be considered second level memory, such as optical memory and the like.

The photonics units 230 may be used to send/receive data through an interconnect link, (e.g., the optical link 250). It should be noted that an optical link (250) is one example link, but additional types of links could be employed, (e.g., electrical). Additionally, logic die 221 in the memory module 220 may provide interface and RAS features.

Figure 3:
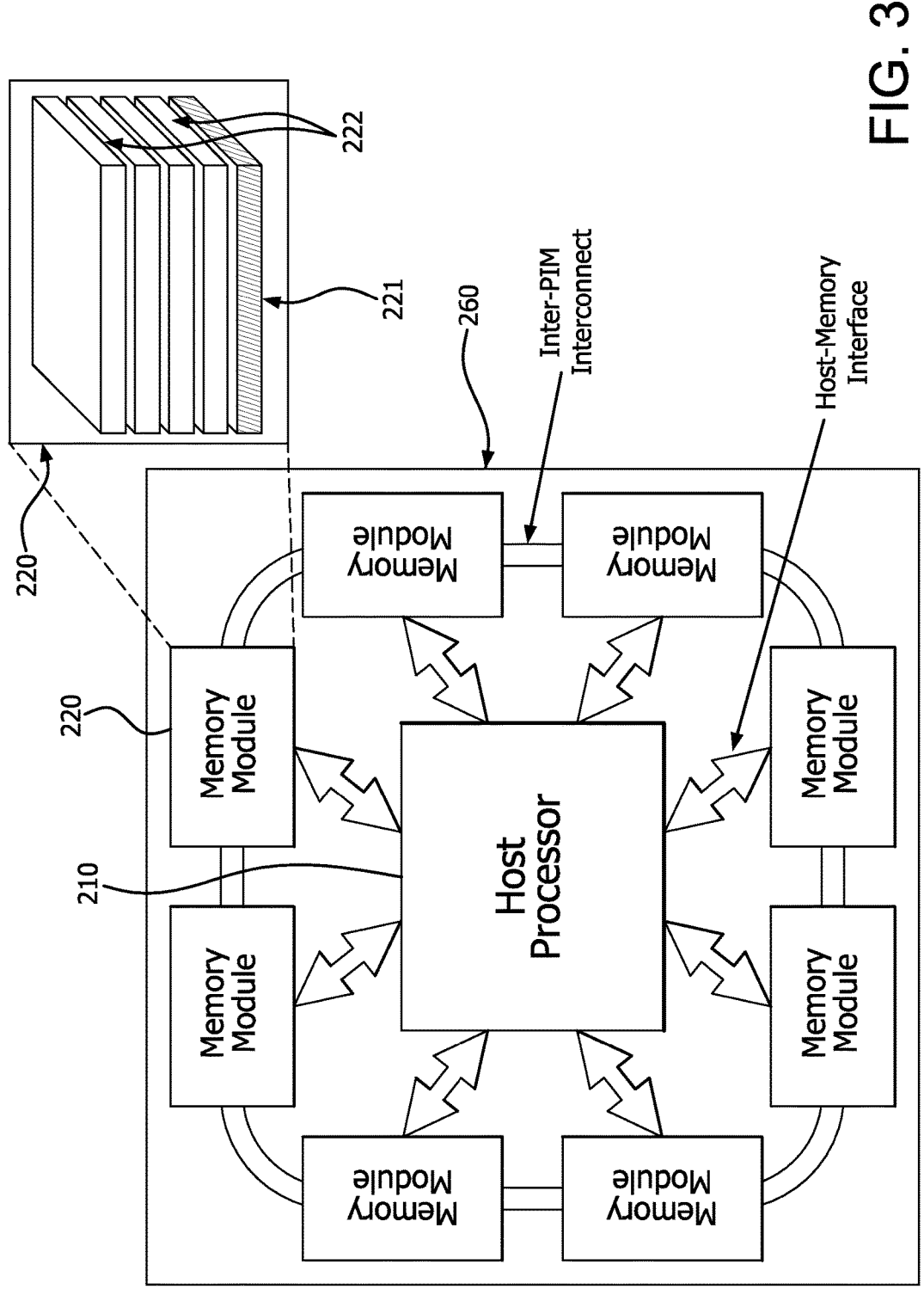
FIG. 3 is a block diagram of an example structure for performing a parallel search operation according to an embodiment.
Figure 4:
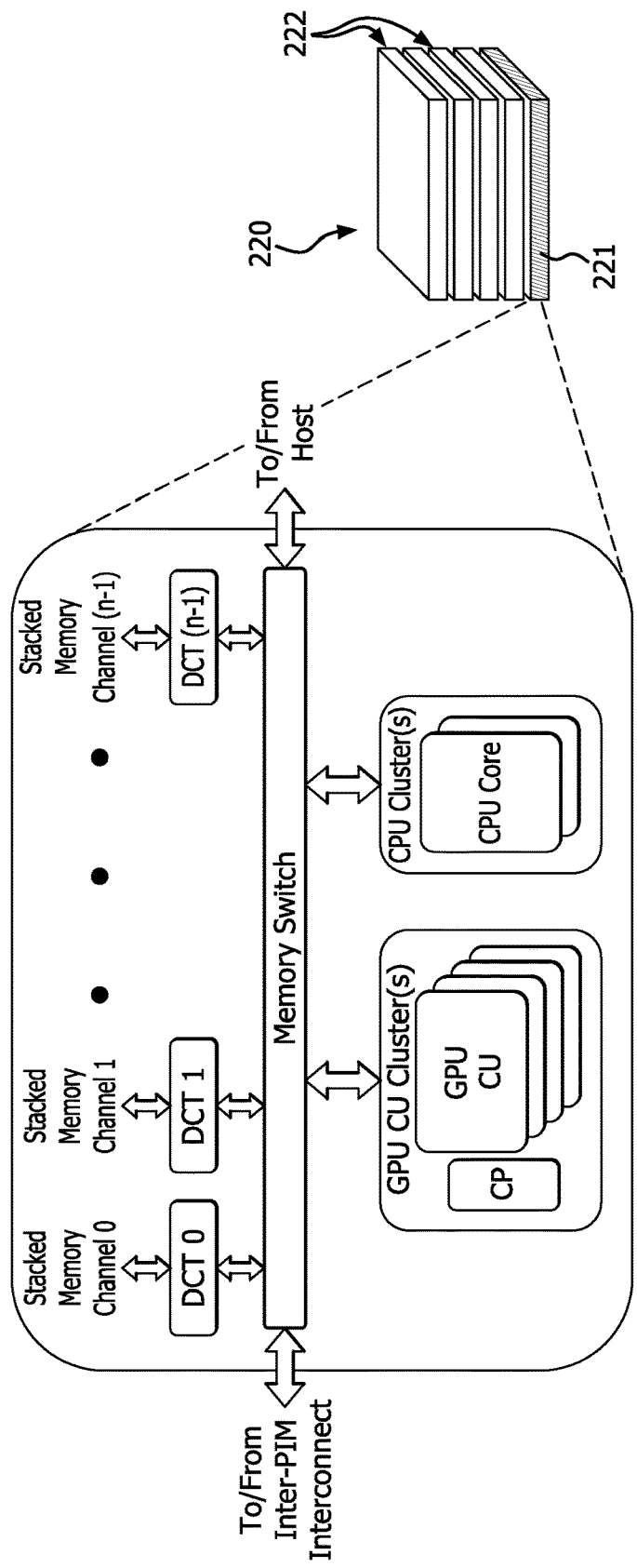
FIG. 4 is an exploded schematic and block diagram of an example memory module of FIGS. 2 and 3 according to an embodiment.

FIG. 3 is a block diagram of an example structure for performing a parallel search operation according to an embodiment. FIG. 3 depicts, for example, the host processor 210 in communication with memory modules 220 via a host-memory interface. In addition, the memory modules 220 are in communication with one another via an inter-PIM interconnect. Further, in the example diagram of FIG. 3, an example memory module 220 is depicted as including logic die with PIM 221 and one or more memory dies 222. The host processor 210 and memory modules 220 are disposed upon an interposer 260. The example structure depicted in FIG. 3 may be based on the architecture 200 and may be referred to as a ring structure, where the memory modules 220 are situated around the host process 210 in a ring pattern. FIG. 4 is an exploded schematic and block diagram of an example memory module 220 of FIGS. 2 and 3 according to an embodiment. More particularly, FIG. 4 depicts an example schematic diagram of the logic die 221. The logic die 221 includes one or more graphics processing unit (GPU) computing unit (CU) cores in a GPU CU cluster, or clusters and one or more central processing unit (CPU) cores in a CPU cluster, or clusters. The GPU CU and CPU cluster(s) communicate with the memory dies 222 via a memory switch through the stacked memory channels 0-(n−1), which may be in communication with memory areas, (e.g., DCT 0, DCT 1 . . . (n−1)), located on one or more memory dies 222. Additionally, the logic die communicates to/from the host via the memory switch to the host-memory interface, and to other memory modules 220 via the memory switch via the inter-PIM interconnect.

Figure 5:
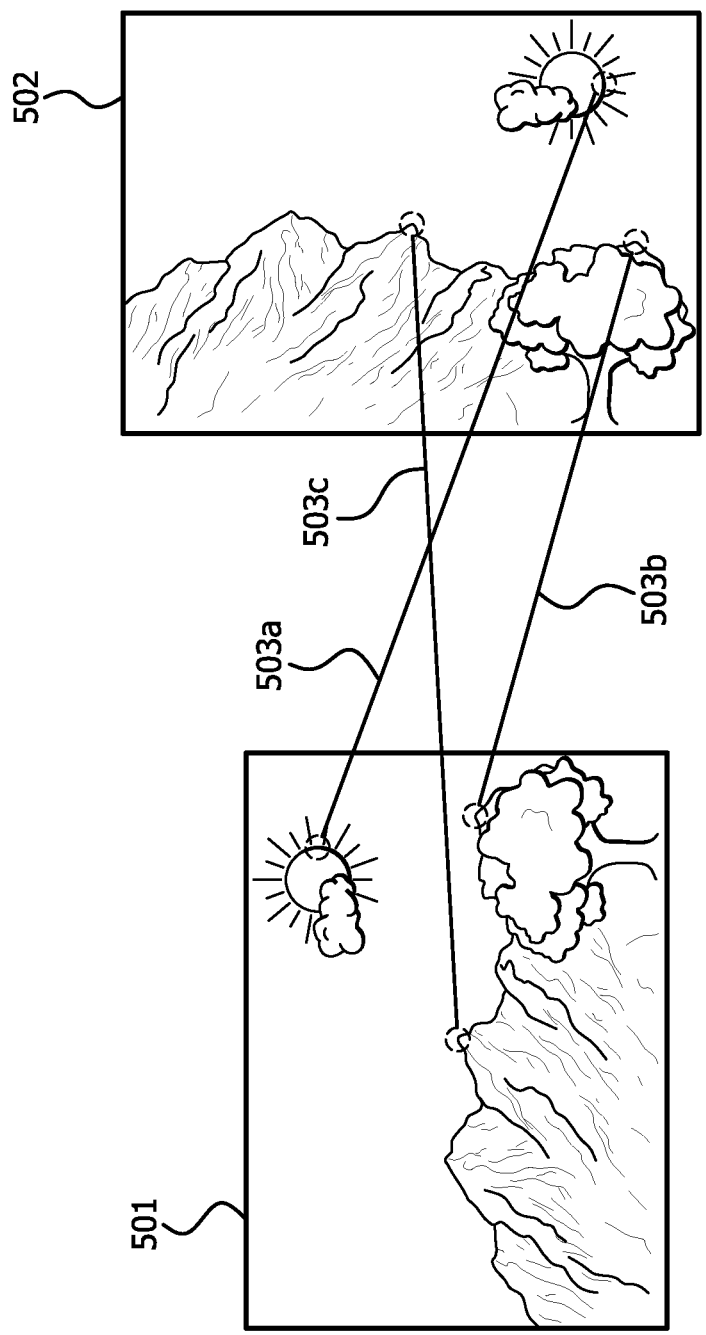
FIG. 5 is an example image comparison in accordance with an embodiment.

FIG. 5 is an example image comparison 500 in accordance with an embodiment. In comparison 500, a query image 501 is compared to an image stored in memory 502, which is an identical image of image 501 that has been rotated ninety (90) degrees clockwise.

Figure 6:
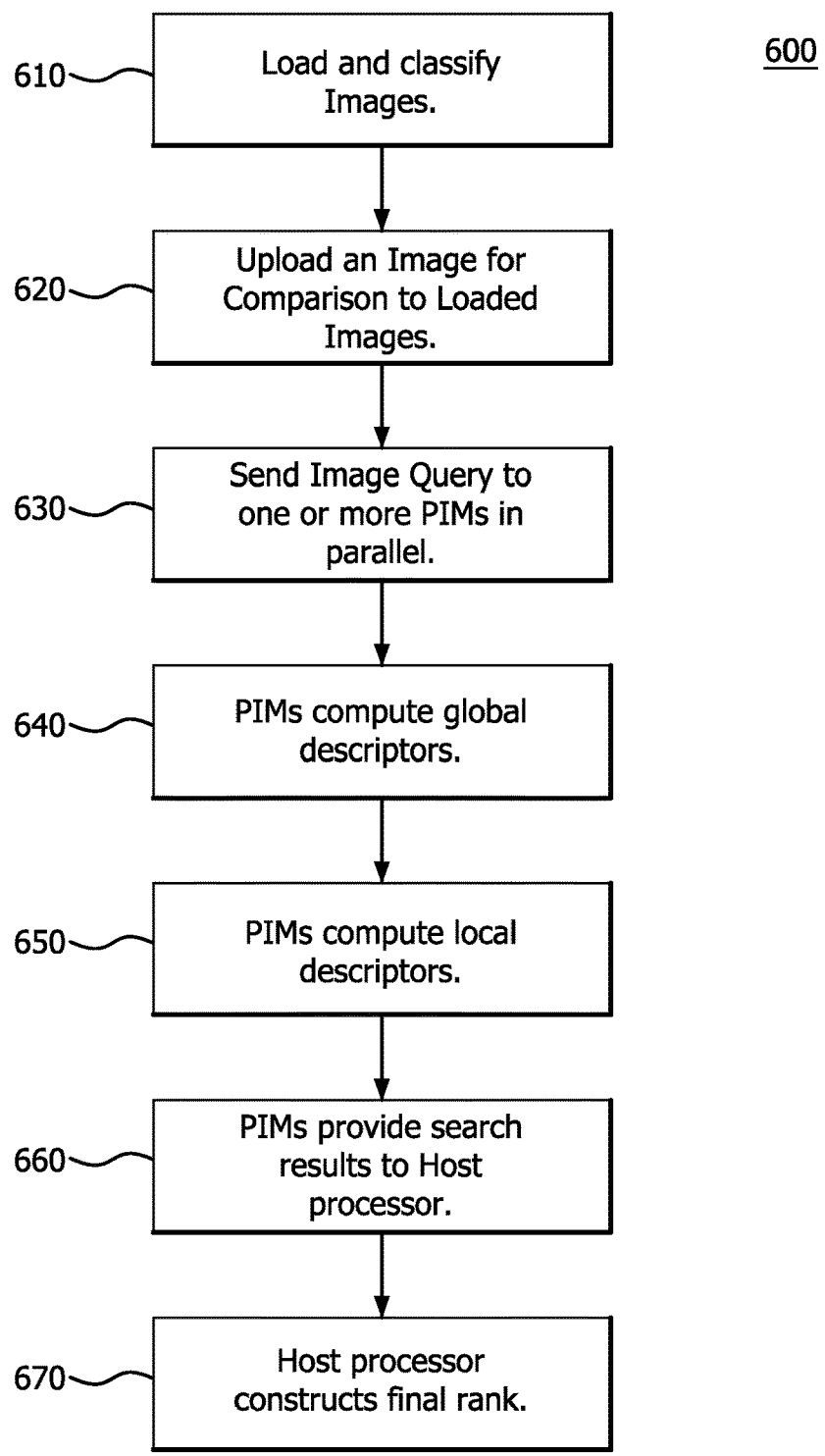
FIG. 6 is a flow diagram of an example method of performing a parallel search operation according to an embodiment.

FIG. 6 is a flow diagram of an example method 600 of performing a parallel search operation according to an embodiment. The method 600 computes the global descriptor, (e.g., descriptors that describe attributes of the entire image such as color, etc.), and performs coarse level classification and image searching at a first level, to reduce the search space and cost for a local descriptor approach significantly. Secondly, a local descriptor approach, (e.g., localized image attributes of area within the images), is employed to perform a more accurate match and verification.

In step 610, images are loaded into memory and classified. Classification may include determining which images include similar image attributes and classifying those similar images as a class of images, (e.g., images of snowstorms may include similar attributes and categorized into a class). The image data may be partitioned and placed randomly among all the memory stacks, (e.g., memory modules 220 and/or 240). Once the image data is classified, a number of ways exist for subsequent placement methods to manage the image data and searching on the memory stacks.

For example, images of the same class may be scattered on all stacks instead of concentrating on one. The scattering algorithms may be any type of randomization, hashing, or other algorithmic mapping. Alternatively, there may be no grouping of any images after the classification. That is, each image still remains in its initial random assignment on the memory stack. In another alternative, images of the same categories may be placed on one memory stack, or multiple adjacent ones if there is not enough space in one. A hierarchical classification may be used to derive sub-categories to achieve this placement schematically. For example, if there are N images and two classes, a first level of classification divides the images into two categories, each containing N/2 images. However, each memory module may not be able to accommodate N/2 images, therefore a second level of classification may be performed to determine sub-categories within the first class, (i.e., within the N/2 images), and images belonging to an individual sub-category may be stored in the same memory module as much as possible. Further nesting, (e.g., additional sub-categories to the sub-categories), may be utilized to further classify images similar to one another and have those similar images stored as much as possible on the same module.

A number of classification algorithms may be utilized for the classification. For example, K-nearest neighbor, supporting vector machine, kernel methods, and other types of classification. In the case of a vast number of dimensions that feature vectors may include, linear or nonlinear dimensionality reduction algorithms, (e.g., manifold learning, Fisher kernel, Principal Component Analysis (PCA), and others) may be employed along with the classification. The linear or nonlinear reduction algorithms may also be used primarily for visualization purpose to inspect the quality of the classification.

In step 620, one or more query images are uploaded for comparison to the loaded images in memory. For example, the query images may be on a flashdrive that is inserted into a computer where images are stored in memory. At this point, for each query (q), global descriptors are initially computed and weak classification is performed, generating a vector P(q), here P is a vector with m elements, and each element represents how likely image q belongs to one category out of the m categories in total. That is, in the training phase, where images are first uploaded, global descriptors of all images in the database may be computed on each PIM that contains a subset of the images from the collection. For example, referring back to FIG. 5, the global attributes of query image 501 are compared to the global attributes of image 502 stored in memory.

The query q is duplicated and sent to one or more of the PIMs in parallel for searching (step 630). That is, where different classifications of images are stored on more than one memory module, the query q is sent to multiple PIMs, (e.g., 220 and/or 240), for searching.

The PIMs then compute global descriptors (step 640). For example, the in-memory search at each PIM may begin with comparing each search entry with the local images categorized as being in the same class as the highest ranked element of the vector P(q), then proceed to subsequent ones in order. For each comparison, a similarity measurement is calculated (e.g., the similar attributes of a local image as compared to the searched query image), and a determination is made as to whether the similarity measurement exceeds a threshold.

For example, given one query image, the descriptor of this query image may be computed either on the host processor 210, with the query image and its descriptor then distributed to all PIMs for ranking and searching. Alternatively, the query image alone may be distributed to all the PIMs and its descriptor may be computed locally on each PIM. For a group query, (i.e., where multiple query images have been uploaded and are queried simultaneously), the aforementioned two alternatives may be applied to the group as a whole. That is, descriptors for multiple query images may be computed on the host processor 210 and the multiple query images and descriptors distributed to all PIMs for ranking and searching, or the multiple query images may be distributed to all the PIMs, which compute the descriptors locally on each PIM. Another alternative for a group query is to distribute a subset of the queries to each PIM and compute their descriptors locally, perform a search and forward the images and descriptors to another PIM to resume the ranking/search on another PIM module. The result on each module may then be aggregated either on the host or one of PIM modules.

If the similarity measurement exceeds the threshold, a local descriptor based comparison is then performed for further verification. That is, the PIMs compute the local descriptors (step 650). For example, localized points 503$a$ corresponding to a part of the sun in images 501/502, 503$b$ corresponding to a top of a tree in images 501/502, and 503$c$ corresponding to a mountain peak in images 501/502, are compared to one another. Where a dimensionality reduction method is used, the number of comparisons and verifications may be reduced to increase the efficiency of this search.

In the case where images of the same categories were placed on one or adjacent memory stacks in step 610, the query q may be conducted in the order of the weak classification such that the PIM containing the images from the highest ranked class is performing the search first, followed by the second highest one and so on. In order to prevent a potential processing delay. A reordering of potential matches to the queries may be utilized to increase the average efficiency while degrading the response of a small number of queries. That is, potential matches to the query image may be re-ordered. The potential matches may be determined based on how similar the global descriptor of the query and the potential matches are. The local descriptors of the query and these potential matches are then compared to compute a pair-wise similarity of the query and each potential match. The potential matches may then be re-ordered based on this similarity metric.

As part of the local descriptor computation, a verification via image registration scheme may be employed, where a target image is one potential match in the data base, and the source image is the query image. Various local descriptor based verification schemes may be utilized. For example, verification via matching the SIFT descriptors of two images is one verification scheme that may be used, which compares the local features between a source and target image.

By having feature extraction and descriptor computation performed locally, each PIM processor, (e.g., logic die 221 of each memory module 220), is acting independently from each other and computing such descriptors of the images in its local memory stack. The computed features or descriptors can be compressed to a smaller fingerprint feature vector before inter-PIM communication or PIM-host communication for the purpose of classification and search on multiple PIMs. Additionally, they can be directly utilized. That is, the computed features or descriptors may be utilized to rank images prior to sending to host processor 210. Once each local PIM has performed the global descriptor, local descriptor and verification phases, the search results are provided to the host processor, (e.g., 210) in step 660. The host processor then constructs the final rank (step 670) for which loaded images match the uploaded and searched images from all of the PIMs from which it receives images. Having the above locally oriented computation scheme with in-memory processing applying to both the global and local descriptor computations, as well as the verification phase may minimize aggregated data movement. This, in turn, may minimize the energy cost associated with such data transfer, and reduce the searching efficiency that the limitation of frequent memory accesses places on it.

It should be understood that many variations are possible based on the disclosure herein. Although features and elements are described above in particular combinations, each feature or element may be used alone without the other features and elements or in various combinations with or without other features and elements.

For example, the topology for the host processor and memory modules depicted in FIGS. 2 and 3 may be referred to as a ring topology. However, any topology may be utilized. Additionally, the host processor 210 may be a processor on one of the PIMs. Further, although an example single PIM node system has been described the methods and apparatus are not limited to any particular PIM system configuration. For example, multiple nodes may be connected to form a PIM network, or a secondary memory system, (e.g., memory modules 240), may be attached to the PIM node. The PIM node may be arranged as a ring or star structure with multiple memory stacks and PIMs. The PIM system can also be augmented with the two-level memory as shown in FIG. 2, where each secondary level memory component, (e.g., memory modules 240), may be a PIM. The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for improving efficiency of an image search, the method comprising:
   receiving, by a first processor, one or more images;
   sending, by the first processor, a query to a plurality of memory modules, wherein the query is for a search of memory for a matching image to the one or more images;
   performing, by a processor-in-memory (PIM) of each respective memory module from the plurality of memory modules, a search of images stored in a memory of the respective memory module, in response to the query received;
   sending, by the PIM of each respective memory model, the matching image obtained from the search to the first processor; and
   performing, by the first processor, a comparison of the matching image received from each of the plurality of memory modules to the one or more images, wherein the PIM of each respective memory module is configured to perform the search of images by:
processing a global descriptor of the one or more images to obtain one or more similarity measurements; and
comparing local descriptors of one or more images whose similarity measurements are above a threshold to the images stored in the memory of the respective memory module to obtain the matching images, wherein the images stored in each respective memory module of the plurality of memory modules are different.

2. The method of claim 1, further comprising uploading and classifying the images stored in the memory of the at least one memory module.

3. The method of claim 2 wherein the images are stored on the plurality of memory modules based on the classifying.

4. The method of claim 2 wherein the images are stored on a same memory module when the images have a same classification.

5. The method of claim 1 wherein the search of images performed by the at least one memory module includes performing a global descriptor computation, a local descriptor computation, and a verification determination.

6. The method of claim 1 wherein the comparison of the comparison includes ranking the matching images received from the at least one memory module.

7. The method of claim 6, further comprising constructing, by the first processor, a final rank of the matching images received from multiple memory modules.

8. A processor for improving efficiency of an image search, the processor comprising:
circuitry configured to send a query for a matching image to a plurality of memory modules, wherein the query includes one or more search images to be matched;
circuitry configured to receive search results from the plurality of memory modules, wherein the search results are received in response to the query; and
circuitry configured to perform a comparison of the search results received from the plurality of memory modules,
wherein the search results are generated by a processor in memory (PIM) of each of the plurality of memory modules performing a search of a respective memory module, wherein the search includes:
processing a global descriptor of the one or more search images to obtain one or more similarity measurements; and
comparing local descriptors of one or more search images whose similarity measurements are above a threshold to images stored in the memory of the respective memory module to obtain the matching image, wherein the images stored in each respective memory module of the plurality of memory modules are different.

9. The processor of claim 8, further comprising circuitry configured to upload and classify the images stored in the memory of the plurality of memory modules.

10. The processor of claim 8, further comprising circuitry configured to rank the search results received from the plurality of memory modules.

11. The processor of claim 10, further comprising circuitry configured to construct a final rank of the search results.

12. A system for improving efficiency of an image search, the system comprising:
a plurality of memory modules, where each of the plurality of memory modules includes a memory and a processor-in-memory (PIM);
a processor that is communicatively coupled to the plurality of memory modules, wherein the processor comprises:
circuitry configured to receive one or more search images;
circuitry configured to send a query to the plurality of memory modules, wherein the query includes the one or more search images;
circuitry configured to receive search results from the plurality of memory modules; and
circuitry configured to perform a comparison of the search results received from the plurality of memory modules; and
wherein the PIM of each respective memory module is configured to perform the search by:
processing a global descriptor of the one or more search images to obtain one or more similarity measurements; and
comparing local descriptors of one or more search images whose similarity measurements are above a threshold to images stored in the respective memory module to obtain the search results, wherein the images stored in each respective memory module of the plurality of memory modules are different.

13. The system of claim 12, wherein the processor further comprises circuitry configured to upload and classify the images stored in the memory of the plurality of memory modules.

14. The system of claim 13 wherein the images are stored on the plurality of memory modules based on a classification of the images stored in the memory of the plurality of memory modules.

15. The system of claim 13 wherein the images stored on a same memory module when the images have a same classification .

16. The system of claim 12 wherein the search of images performed by the at least one memory module includes performing a global descriptor computation, a local descriptor computation, and a verification determination.

17. The system of claim 12, wherein the processor further comprises circuitry configured to rank the search results received from the plurality of memory modules.

18. The system of claim 17, wherein the processor further comprises circuitry configured to construct a final rank of the search results received from the plurality of memory modules.

19. A method implemented for improving efficiency of an image search that is in a processor-in-memory (PIM) system having a first processor and a plurality of memory modules, the method comprising:
uploading and classifying one or more images by their image data;
partitioning and storing the images on the plurality of memory modules based upon the classification of the image data;
receiving one or more query images by the first processor;
sending, by the first processor, a query to the plurality of memory modules, wherein the query includes the one or more query images;
performing, by a PIM of each respective memory module of the plurality of memory modules, a search of images stored in a memory of the respective memory module, wherein the search of images is performed in response to the query;
sending, by each memory module of the plurality of memory modules, search results to the first processor; and performing, by the first processor, a comparison of the search results from the plurality of memory modules, wherein the search of images comprises:

processing a global descriptor of the one or more query images to obtain one or more similarity measurements; and comparing local descriptors of one or more query images whose similarity measurements are above a threshold to images stored in the respective memory module to obtain the search results.

20. The method of claim 19 wherein the images are stored on a same memory module when the images have a same classification.

21. The method of claim 19 wherein the images from a same class are distributed among the plurality of memory modules.

22. The method of claim 21 wherein the images from the same class are distributed among adjacent memory modules.

23. The method of claim 19 wherein the search of images performed by the plurality of memory modules includes performing a global descriptor computation, a local descriptor computation, and a verification determination.

24. The method of claim 23 wherein the computing of the global descriptor includes comparing the one or more query images to the images stored in the plurality of memory modules categorized as being in a same class as the one or more query images.

25. The method of claim 24, further comprising computing the similarity measurement and comparing the similarity measurement to a threshold.

26. The method of claim 25 wherein if the similarity measurement exceeds the threshold, the local descriptor is computed.

27. A non-transitory computer-readable medium having instructions recorded thereon that, when executed by a computing device, cause the computing device to perform operations to improve efficiency of an image search, the operations comprising:

receiving one or more query images;

sending a query to a plurality of memory modules, wherein the query includes the one or more query images;

performing, by a processor in memory (PIM) of each of the plurality memory modules, a search of images stored in a respective memory of a respective memory module, wherein the search is performed in response to the query;

performing a comparison of search received results received from the plurality of memory modules, wherein the search of images is performed by each PIM of the plurality of memory modules:

processing a global descriptor of the one or more query images to obtain one or more similarity measurements; and comparing local descriptors of one or more query images whose similarity measurements are above a threshold to images stored in the memory of the respective memory module to obtain the search results.

28. The non-transitory computer-readable medium of claim 27, further comprising uploading and classifying the images stored in the plurality memory modules.

29. The non-transitory computer-readable medium of claim 28 wherein the images from a same class are stored on the plurality of memory modules.

30. The non-transitory computer-readable medium of claim 28 wherein the images from a same class are stored on a same memory module.

31. The non-transitory computer-readable medium of claim 27 wherein the search of images includes performing a global descriptor computation, a local descriptor computation, and a verification determination.

32. The non-transitory computer-readable medium of claim 27 wherein the comparison includes ranking the search results received from the plurality of memory modules.

33. The non-transitory computer-readable medium of claim 32, further comprising constructing a final rank of the search results.

* * * * *